United States Patent Office 3,730,891
Patented May 1, 1973

3,730,891
INTUMESCENT COMPOSITION, FOAMED PRODUCT PREPARED THEREWITH, AND PROCESS FOR MAKING SAME
Salvatore R. Riccitiello, 1950 Montemar Way, San Jose, Calif. 95125, and John A. Parker, 22938 McClure Lane, Los Altos, Calif. 94022
No Drawing. Filed May 6, 1971, Ser. No. 140,946
Int. Cl. C09k 3/28
U.S. Cl. 252—8.1       8 Claims

ABSTRACT OF THE DISCLOSURE

An intumescent composition and the foamed product prepared by heating the composition are provided wherein the composition comprises the reaction product of para-benzoquinone dioxime and a concentrated mineral acid such as sulfuric acid, phosphoric acid, and polyphosphoric acid. The composition is useful as an intumescent agent either by itself or when combined with other materials. A fire-resistant and heat-insulating composition is provided by heating the intumescent composition above its intumescent temperature.

---

The invention described herein was made by employees of the United States Government and may be manufactured and used by or for the Government for governmental purposes without the payment of any royalties thereon or therefor.

BACKGROUND OF THE INVENTION

Field of the invention

Intumescent agents and compositions. Generally, these agents and compositions are utilized in conjunction with or for the improvement of fire-retardant compositions and coatings. The present invention also includes the field of fire-resistant and heat-insulating compositions resulting from the heating and intumescence of the intumescent agent and to the process for making such heat-insulating compositions.

Description of the prior art

Intumescent agents possessing various degrees of utility and foaming efficiency, and varying greatly in structure and chemical composition have been known for many years. The original interest in such materials probably dates back to the use of pyrotechnics in ancient times. More recently, however, H. N. Alyea, J. Chem. Educ., 33, No. 4, 15A, 1956, discloses the production of chemical "serpents" from 4-nitroacetanilide and sulfuric acid.

In U. S. Pat. No. 3,535,130, J. A. Parker and G. M. Fohlen disclose a highly efficient char-forming intumescent paint in which the intumescent material comprises the bisulfate of para-nitroaniline and of its substituted derivatives. The paints of the above patent provide a voluminous fire-resistant and heat-insulating foam when heated at 260° C. and higher; however, due to the nature of the intumescent material, the paint is somewhat sensitive to moisture.

An advantage of the intumescent compositions of the invention is the provision of a novel class of low temperature intumescent agents. Whereas the well-known prior art intumescent agents intumesce in the range of 200° C to 325° C., the agents of the present invention intumesce at about 110° C. and provide a low density heat-insulating foam useful, as such, in fire protective applications.

Another advantage of this type of intumescent agent is that it can be made by the use of 85% phosphoric acid. The use of this acid provides an agent or composition which is less corrosive than prior-art intumescent agents which include or are made with a nitroaniline.

SUMMARY OF THE INVENTION

An object of the present invention is to provide an intumescent composition or agent which comprises the reaction product of a para-benzoquinone dioxime with a mineral acid such as sulfuric acid, phosphoric acid, and polyphosphoric acid. A preferred method for preparing the intumescent agents of the invention includes the slow addition of the mineral acid to the selected amount of dioxime. During the addition of the acid, the temperature of the reaction is kept below 50° C. in order to prevent the development of an active exothermic reaction.

It was found that the proportions of the reactants could vary so long as the mole ratio of the dioxime to the acid is maintained between .25 and 2.00. In physical appearance, the reaction products using different acids and different proportions of such acids ranged from powders for low acid ratio to a paste as the ratio of acid was increased.

The intumescent agents prepared in the manner described herein may be used per se as intumescent agents or they may be combined with or incorporated into other compositions in the preparation of intumescent composites. For example, the intumescent agent, per se, either as the dry powder or in the form of dry pellets, may be blown into or otherwise placed in the space between building walls, void spaces in ship and airplane structures, etc., as fire-protective agents. Exposure of such structures to intumescent or higher temperatures will cause the intumescent agents to foam and swell to many times (60–200) their original volume and fill the void space. Since, as will be shown below, the products formed by intumescing or foaming the intumescent agents of the invention are both highly fire-resistant and heat-insulating, filling the void space of the structure with the intumescing agents of the invention will tend to suppress and prevent spreading of the fire across the walls of the structure.

Another object of the invention is to provide a fire-resistant, thermally-insulating, low-density foam prepared by heating the benzoquinone dioxime-concentrated acid reaction product prepared as described herein. These low-density foams have a distinct utility apart from the utility of the foams which are formed in situ by intumescing the intumescent agents described herein.

In making the fire resistant, thermally-insulating foam of the invention, a preferred method consists of placing the intumescent agent in a reaction vessel, heating the material above the intumescent temperature to about 150° C. until completely foamed, then allowing the foamed material to cool. Generally, the density of the foam will vary from .5 to 10 lbs./ft.$^3$. The material may be foamed in a mold to a desired shape or the foam may be crushed into small particles. Thus, using a mold a heat-insulating slab of the foam could be made to fit on or around any desired structure to provide thermal insulation. on the other hand, a confined space, for example, may be provided with thermal insulation by blowing in or otherwise adding the low-density foam into the said confined space.

The foam polymeric material can be crushed into small particles and added to resinous materials to act as a density control agent as well as render the composite thermally and oxidatively stable. The foam can be compounded with varying substances such as fibers and inert fillers to make high temperature composite billets for use as thermal protection materials such as heat shields for space vehicles.

Another object of the invention is to provide a simple process for making the intumescent material of the invention with inexpensive and readily available materials.

DESCRIPTION OF THE PREFERRED EMBODIMENTS

The following examples will further illustrate and describe the invention without, however, limiting its scope.

Example 1

This example illustrates the preparation of the p-benzoquinone dioxime-sulfuric acid intumescent composition using a mole ratio of dioxime to acid of 0.5.

To 1.38 grams of p-benzoquinone dioxime was added, while stirring, 1.96 grams of concentrated sulfuric acid (96%; density 1.84) within about five minutes. The mixture produced an exothermic reaction. It was cooled while stirring and maintained at a temperature of about 50° C. After cooling, the product was found to be a greenish-black free-flowing powder.

Example 2

This process illustrates the preparation of the fire-resistant heat-insulating foam by heating the product of Example 1.

One (1) gram of the p-benzoquinone dioxime-sulfuric acid reaction product of Example 1 was placed in a container and then heated on a hot plate maintained at a temperature of about 150° C. The reaction product melted to a dark liquid and produced a thick foam as soon as the material temperature reached 150° C. (about one minute). 0.72 gram of foam was produced for a yield of 72%. The foamed product was cooled, dried, and broken up to a fine particle size. The foamed product had a density of 0.6 lb./ft.$^3$, was insoluble in such powerful solvents as dimethyl formamide, dimethyl sulfoxide, and hot sulfuric acid, and withstood temperatures of over 600° C. without combustion or destruction when exposed to a JP-4 aviation fuel fire. A fire of this type exposes the product to a total flux of 10 B.t.u./ft.$^2$-sec. The product foam density varies from 0.6 lb./ft.$^3$ to about 15 lbs./ft.$^3$ depending on the acid used and the weight fraction of acid used. This is particularly true in the case when polyphosphoric acid is used. At a weight ratio of 1.380 grams dioxime to 1.96 grams of acid, the resulting foam is approximately 16 lbs./ft.$^3$. The foams for all the reactions are chemically inert to most common solvents such as acetone, petroleum ether and benzene as well as the more exotic solvents like dimethyl sulfoxide, dimethyl formamide, and hot sulfuric acid. The foams produced in the manner described herein are black, coherent and mainly closed cell. The foams have compressive strengths varying from ½ p.s.i. to about 10 p.s.i. depending on the density and condition of preparation.

Other intumescent compositions were prepared by the procedure of Example 1 with p-benzoquinone dioxime and different proportions of sulfuric acid, phosphoric acid, and polyphosphoric acid. Tables I, II, and III below set forth typical examples of such compositions and the corresponding intumescing temperature and char (foam) yield obtained by heating the respective samples in a thermogravimetric analysis (TGA) apparatus at 3° C./min. under nitrogen.

TABLE I
p-Benzoquinone Dioxime-Sulfuric Acid Intumescent Composition

| Sample | Weight, g. | Composition | Mol ratio | T., °C.[a] | Yield[b] (foam), percent |
|---|---|---|---|---|---|
| 1 | 1.38 / 1.96 | D[c] / H$_2$SO$_4$ | .5 | 138 | 72 |
| 2 | 1.38 / 0.98 | D[c] / H$_2$SO$_4$ | 1.0 | 111 | 52 |
| 3 | 1.38 / 0.66 | D[c] / H$_2$SO$_4$ | 1.5 | 108 | 49 |
| 4 | 1.38 / 0.51 | D[c] / H$_2$SO$_4$ | 2.0 | 110 | 50 |
| 5 | 1.38 / 0.39 | D[c] / H$_2$SO$_4$ | 2.5 | 111 | 50 |

[a,b] Intumescence temperature and foam yield as determined by TGA at 3° C. under N$_2$ atmosphere.
[c] Para-benzoquinone dioxime.

TABLE II
p-Benzoquinone Dioxime-Phosphoric Acid Intumescent Composition

| Sample | Weight, g. | Composition | Mol ratio | T., °C.[a] | Yield[b] (foam), percent |
|---|---|---|---|---|---|
| 1 | 1.38 / 4.62 | D[c] / 85% phosphoric acid | 0.25 | 110 | 80 |
| 2 | 1.38 / 2.31 | D[c] / 85% phosphoric acid | 0.50 | 105 | 76 |
| 3 | 1.38 / 1.15 | D[c] / 85% phosphoric acid | 1.0 | 115 | 67 |

See Table I for footnotes a, b, and c.

TABLE III
p-Benzoquinone Dioxime-Polyphosphoric Acid Intumescent Composition

| Sample | Weight, g. | Composition | T., °C.[a] | Yield[b] (foam), percent |
|---|---|---|---|---|
| 1 | 1.38 / 0.98 | D[c] / Polyphosphoric acid | 112 | 78 |
| 2 | 1.38 / 1.96 | D[c] / Polyphosphoric acid | 115 | 75 |
| 3 | 1.38 / 0.51 | D[c] / Polyphosphoric acid | 115 | 75 |

See Table I for footnotes a, b, and c.

Polyphosphoric acid is commercially available and has the following general formula: $H_{n+2} P_n O_{3n+1}$ where $n$ ranges from 2 to 4.

It is believed that the fire-resistant, heat-insulating foamed compositions obtained by heating the intumescent compositions of the invention are stable heteropolymers of the class commonly known as semi-ladder and ladder polymers. Such polymers are formed by condensation and hydrolysis reactions of ring or ring-forming reactants. The end product may be a heat-resistant polyquinoxaline-type polymer or a polyphenoxazine-type polymer. Although the exact structure of the foamed polymer is not known, elemental analysis and other data support the proposition that the actual structure is probably a combination of open and closed ring structures related to polyquinoxaline polymers (Equation 1).

(1)

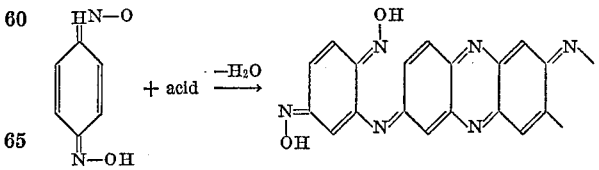

This structure is derivable from the starting material by condensation and ring closure to varying degrees. If hydrolysis occurs to any of the oxime groups, then the structure can be proposed as follows:

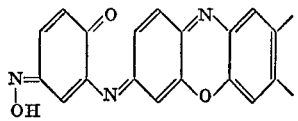

What is claimed is:

1. The process for making an intumescent composition which comprises reacting para-benzoquinone dioxime with a concentrated mineral acid at a temperature of 50° C. or below, the mole ratio of the said dioxime to the said acid ranging from 0.25 to 2.0.

2. The composition made according to the process of claim 1.

3. The process of claim 1 wherein the acid is concentrated sulfuric acid.

4. The composition made according to the process of claim 3.

5. The process of claim 1 wherein the acid is concentrated phosphoric acid.

6. The composition made according to the process of claim 5.

7. The process of claim 1 wherein the acid is polyphosphoric acid.

8. The composition made according to the process of claim 7.

References Cited

UNITED STATES PATENTS 2,446,165  8/1948  Trepognier ......... 260—396

GEORGE F. LESMES, Primary Examiner

W. R. DIXON, JR., Assistant Examiner

U.S. Cl. X.R.

106—15 FP; 260—396 N, 2 R, 2.5 R; 102—105; 252—62